Patented May 4, 1948

2,440,953

UNITED STATES PATENT OFFICE 2,440,953

PIGMENTED EMULSION TYPE COATING COMPOSITION

John W. Iliff, Springfield, and Martha Torrey, Philadelphia, Pa., assignors to E. I. du Pont de Nemours & Company, Wilmington, Del., a corporation of Delaware No Drawing. Application April 11, 1944, Serial No. 530,560

9 Claims. (Cl. 106—228)

This invention relates to coating compositions and more particularly to aqueous resin and oleoresinous emulsion coating compositions. Still more particularly it relates to aqueous resinous emulsion coating compositions which produce films of improved luster.

Aqueous resin emulsions as coating composition vehicles have previously been described. Among such resin emulsions may be mentioned alkyd resin aqueous emulsions. Such aqueous resin emulsions have not found ready and wide application chiefly because of certain pigmentation and stability difficulties chiefly with respect to maintaining the desired phase relation of the pigmented emulsion. In general such emulsion compositions produce films or coatings having low gloss or luster. Compositions which produce films of coatings having a desirable gloss have been produced in certain solid colors. However, in the production of white compositions difficulties are encountered in producing materials which produce glossy films or coatings and which possess satisfactory stability in this respect. The difficulty appears to be due to a tendency for the white pigment (titanium dioxide) to migrate from the oil phase into the external aqueous phase of the emulsion resulting in instability with respect to producing glossy films or coatings. Since there is an increasing demand for white and light colored coating compositions of the resin emulsion type which produce glossy films the production of such materials of suitable stability is highly desirable. The desirability of the resin aqueous emulsions as the coating composition vehicle is readily apparent to those skilled in the art of manufacturing and using decorative and protective coating compositions.

This invention therefore presents as the principal object means for producing stable white or tinted emulsion coating compositions which will produce glossy films. A further object is the production of emulsion coating compositions in which the non-aqueous phase of the emulsion is a fatty oil modified alkyd resin or oleoresinous varnish. A still further object is the production of such coating compositions by means which are simple and economical. Another object is the production of such compositions which possess the desirable and necessary properties of application required in satisfactory decorative and protective coating compositions as well as satisfactory service life. Other objects will be apparent as the description of the invention proceeds.

These objects are accomplished in the present invention by incorporating, as the principal pigment in the composition, titanium dioxide which has been treated (as hereinafter described) to impart to it organophylic properties with respect to its action in the aqueous resin emulsion vehicle.

Titanium dioxide pigments as ordinarily used are hydrophilic in nature. For the purposes of the present invention it is desired that they possess organophilic properties. Such properties may be imparted to titanium dioxide pigments by a combination of procedures as described in U. S. Patent 2,286,910 and copending applications S. N. 392,942, filed May 10, 1941, by Daiger and Seidel, now Patent No. 2,357,089, issued August 29, 1944, and S. N. 521,132, filed February 4, 1944, by Booge and Seidel. Patent 2,286,910 describes a method of producing aluminum hydroxide coated titanium dioxide pigment particles. Patent 2,357,089 describes a method of producing fourth group metal silicate coated titanium dioxide pigment particles, titanium, zirconium, tin, lead, and cerium being disclosed as the preferred fourth group metals. The Booge and Seidel application describes a process which comprises hydrolyzing an anatase-yielding titanium salt solution in the presence of a seeding agent, calcining in the presence of a soluble alkali metal compound and a compound of zinc, grinding the calcined product, precipitating a white hydrate of an amphoteric metal onto the finely divided pigment, and then drying, disintegrating, and recovering the final surface treated pigment. Aluminum, silicon, titanium, and tin are disclosed as the preferred amphoteric metals. Other treatments which may impart organophilic properties to titanium pigments are not to be precluded from the present invention.

The invention will be more fully understood by the following examples which are given by way of illustration and not limitation except insofar as defined in the appended claims. The parts are by weight.

EXAMPLE I

Mill base

| | Parts |
|---|---|
| Titanium dioxide pigment | 45.0 |
| Oil modified alkyd resin | 55.0 |

The titanium dioxide pigment used in this and subsequent examples was of the type previously described.

The alkyd resin was a 60% linseed oil modified glyceryl phthalate-100% solids.

The pigment and the resin were mixed and then passed once over a three roll pigment dispersion mill. Other convenient or available means for dispersing the pigment in the resin may be used.

*Finished composition*

|  | Parts |
|---|---|
| Mill base | 58.0 |
| Casein dispersion | 28.0 |
| Sodium lauryl sulfate | 1.0 |
| Cobalt linoleate drier | .5 |
| Manganese linoleate drier | .5 |
| Monoethyl ether of diethylene glycol | 3.0 |
| Water | 9.0 |
|  | 100.0 |

The casein dispersion was prepared in aqueous borax solution having 14% casein.

The cobalt and manganese driers were solutions in mineral spirits containing 2% and 3% respectively of the metal.

The ingredients were added in the order named and then thoroughly mixed by vigorous agitation as for example in a Pony mixer or similar device.

This composition after having been reduced with water to a viscosity suitable for application produces a film with a high semi-gloss luster, which is tack-free within one-half hour to one hour and hard after an overnight dry. The coating is washable within a week's time and its resistance to erosion is comparable to a straight oil type paint presently available.

EXAMPLE II

*Mill base*

|  | Parts |
|---|---|
| Titanium dioxide | 48.0 |
| Zinc oxide | 2.0 |
| Oil modified alkyd resin (solids) | 50.0 |
|  | 100.0 |

The alkyd resin used was a 62% soya bean oil modified gyceryl phthalate resin-100% solids.

The mill base was prepared as described under Example I.

*Finished composition*

|  | Parts |
|---|---|
| Mill base | 46.0 |
| Casein dispersion | 50.0 |
| Cobalt drier | .5 |
| Manganese drier | .5 |
| Potassium lauryl phthalate | 1.0 |
| Butyl ether of ethylene glycol | 2.0 |
|  | 100.0 |

The casein dispersion was prepared in an aqueous borax solution and contained 12% solids.

The driers were solutions of cobalt and manganese naphthenate as described under Example I.

The composition was prepared by thorough mixing of the ingredients as previously described.

The finished paint when used as described under Example I yields a hard, tough and durable decorative and protective coating possessing excellent service life.

EXAMPLE III

The following example illustrates a light grey composition:

*Mill base*

|  | Parts |
|---|---|
| Titanium dioxide | 24.5 |
| Lamp black | 4.5 |
| Yellow ochre | 1.5 |
| Amorphous silica | 4.5 |
| Oil modified alkyd resin | 65.0 |
|  | 100.0 |

The alkyd resin was a 68% linseed oil modified glyceryl phthalate-100% solids.

The mill base was prepared as previously described.

*Finished composition*

|  | Parts |
|---|---|
| Mill base | 51.0 |
| Casein dispersion | 26.0 |
| Cobalt drier | 1.0 |
| Manganese drier | 1.0 |
| Potassium lauryl phthalate | 3.0 |
| Ethyl ether of diethylene glycol | 5.0 |
| Water | 13.0 |
|  | 100.0 |

The casein dispersion was prepared in aqueous borax-sodium fluoride solution-14% solids.

The driers were as described above.

The composition is made by mixing the ingredients in the order named and thoroughly agitating.

The paint when applied to either bare wood or over old paint, yields a satisfactorily adhering, hard protective and decorating coating which possesses excellent smudge resistance, washability and satisfactory durability.

EXAMPLE IV

The following illustrates the use of an oleoresinous vehicle in place of the fatty oil modified alkyd resin.

*Mill base*

|  | Parts |
|---|---|
| Titanium dioxide | 35.4 |
| Oleoresinous vehicle | 64.6 |
|  | 100.0 |

The oleoresinous vehicle used consisted of medium bodied linseed oil 42.7 parts and Congo resin 21.9 parts by weight and was prepared in the conventional manner well known in the coating composition art.

The mill base was prepared as described in the foregoing examples.

*Finished composition*

|  | Parts |
|---|---|
| Mill base | 57.6 |
| Casein dispersion | 29.4 |
| Sodium lauryl sulfate | .2 |
| Cobalt drier | 1.1 |
| Manganese drier | .4 |
| Water | 11.3 |
|  | 100.0 |

The casein dispersion and the driers were as used in Example III.

The composition is prepared by mixing the ingredients in the order named and thoroughly agitating.

When diluted with water and thoroughly mixed to a viscosity suitable for application (solids content approximately 40.0%) and applied by brushing or spraying to wood, metal or a flexible substrate as paper, etc., the composition serves as a good sealing agent and may further serve as a primer for subsequent coatings of orthodox oil paints.

By the term "oil-in-water emulsion," as used in the appended claims, is meant an emulsion in which the outside phase is water and the inside phase is a member of the group which consists of drying oil modified alkyd resins, semi-drying oil modified alkyd resins, and oleoresinous varnishes.

Fatty oil modified alkyd resins of various types may be used in preparing the presently described compositions. Drying oil or semi-drying oil modified alkyds are in general preferred. Also various types of natural or synthetic resin or gum varnishes may be used as shown in Example IV. The conventional oil length of the resinous or oleoresinous vehicle may conveniently vary between 40 and 85%, the particular choice being largely governed by desired properties in the finished composition. Among suitable alkyd resin types may be noted the glyceryl phthalate, pentaerythritol-phthalate, maleic acid alkyds and various commonly known modifications thereof.

While the use of zinc oxide, as a component of the pigment is desirable, it may be dispensed with. It has been found preferable to use an amount of zinc oxide not greater than 15% of the total pigment content of the composition.

The range of the ratio of pigment to resin or oleoresinous vehicle has been found to conveniently vary between $45/100$ and $160/100$, a ratio either above or below not yielding the most desirable results in the finished composition.

The ratio of the protective colloid (as the casein dispersion) to the resinous component may vary within limits of from $50/100$ to $4/100$, greater or lesser ratios being avoided for the most desirable finished composition. Other protective colloid materials well known in the art may be used in place of the casein dispersion although in general for practical reasons the latter is preferred.

In addition to the sodium lauryl sulfate and potassium lauryl phthalate as emulsifying agents as given in the examples alkali metal lauryl sulfonates and corresponding materials may be used. In addition the alkali metal octyl sulfates or sulfonates may be used. While the above emulsifiers have been used with satisfactory results other emulsifiers may be used if desired.

The small amount of organic solvent used in some of the examples is preferred but may be dispensed with in certain compositions. The solvent may be designated as a mutual solvent and in addition to those given in the example may be used the methyl, ethyl, n-propyl ethers of ethylene glycol as well as the corresponding alkyl ethers of diethylene glycol; also similarly related materials of corresponding properties.

It will be apparent from the foregoing that a marked advance has been made by the present invention in the production of coating compositions of the emulsion type especially in white and light colors. These compositions in which the pigment is contained in the internal phase of the emulsion possess marked advantages over the regular oil type compositions or paints widely used in the present state of the art. Paints of the present invention dry very rapidly as for example to a usable surface in approximately ½ hour as compared to 5 hours required for an ordinary organic solvent paint to reach a so-called "set up" stage. A further advantage of the emulsion paint is the substantial absence of organic solvent odor during and subsequent to application with the attendant elimination of the safety hazard due to the usual presence of inflammable solvent vapor. A still further advantage of the emulsion paints over the conventional oil type paints is the ease of application which is further reflected in economy of use. The ease of cleaning brushes and so forth after the application of the emulsion paint by simple washing with soap and water is a further economic advantage over the use of the conventional oil type paints. Coatings produced from the emulsion paints of the present invention possess marked advantages over the ordinary flat emulsion paints or water paints in general in that they are readily and satisfactorily washable after about one month's aging to a degree comparable with a high gloss oil paint. Further they possess good outside durability, excellent adhesion over most types of substrate, good smudge resistance, definite ease of cleaning and other desirable characteristics usually associated with the conventional oil type paints. Other advantages will be readily apparent to those skilled in the manufacture and use of decorative and protective coating compositions.

The compositions described herein are particularly applicable for interior use on floors, walls, trim work, furniture, cabinets of various types, etc. Because of their outside service durability they are applicable to masonry, wood and metal in places which are in continual contact with the elements of the weather. As previously indicated excellent adhesion is obtained when applied to a variety of substrate as wood, plaster, masonry, glass, composition boards, plastics, etc. They are particularly useful for repaint or redecorating work over conventional oil or water paints or if desirable or necessary may be used as self primers. Many other uses will be readily suggested to those skilled in the art.

It is apparent that many widely different embodiments of this invention may be made without departing from the spirit and scope thereof, and therefore, it is not intended to be limited except as indicated in the appended claims.

We claim:

1. A coating composition having a luster when dry, comprising an oil-in-water emulsion in which the inside phase contains a titanium dioxide pigment in addition to a member of the group which consists of drying oil modified alkyd resins, semi-drying oil modified alkyd resins, and oleoresinous varnishes, the pigment particles being coated with an amphoteric metal compound selected from the group which consists of aluminum hydroxide, silicon hydroxide, titanium hydroxide, tin hydroxide, titanium silicate, tin silicate, zirconium silicate, lead silicate, and cerium silicate.

2. The composition of claim 1, in which the resinous component is a drying oil modified alkyd resin.

3. The composition of claim 1, in which the resinous component is a semi-drying oil modified alkyd resin.

4. The composition of claim 1, in which the resinous component is an oleoresinous varnish.

5. The composition of claim 1, in which the ratio of pigment to resinous component of the inside phase is from 45 to 160 parts of pigment to 100 parts of resinous component.

6. The composition of claim 1, in which the aqueous phase contains from 4 to 50 parts of a protective colloid to 100 parts of the resinous component of the inside phase.

7. The composition of claim 1, in which the solids content is 40%.

8. The composition of claim 1, in which the oil length of the resinous component is from 40% to 85%.

9. The process of preparing oil-in-water emulsion coating compositions that dry to a glossy finish, which comprises mixing equal parts of a resinous vehicle selected from the group which consists of drying oil modified alkyd resins, semi-drying oil modified alkyd resins, and oleoresinous varnishes, and a titanium dioxide pigment, the pigment particles being coated with an amphoteric metal compound selected from the group which consists of aluminum hydroxide, silicon hydroxide, titanium hydroxide, tin hydroxide, titanium silicate, tin silicate, zirconium silicate, lead silicate, and cerium silicate, and then emulsifying the resinous vehicle with an aqueous dispersion of casein and an emulsifying agent whereby the pigment remains in the internal phase.

JOHN W. ILIFF.
MARTHA TORREY.

REFERENCES CITED

The following references are of record in the file of this patent:

UNITED STATES PATENTS

| Number | Name | Date |
|---|---|---|
| 2,178,474 | Frick | Oct. 31, 1939 |
| 2,198,669 | Jenett | Apr. 30, 1940 |
| 2,272,057 | Cheetham | Feb. 3, 1942 |
| 2,286,910 | Hanahan et al. | June 16, 1942 |
| 2,356,794 | Peiker | Aug. 29, 1944 |
| 2,379,070 | Evans | June 26, 1945 |

FOREIGN PATENTS

| Number | Country | Date |
|---|---|---|
| 599,211 | Germany | June 27, 1934 |

OTHER REFERENCES

Elm et al., Official Digest, Fed. of Paint and Varn. Prod. Clubs, February 1943, pp. 35 to 48.

Davis et al., Industrial & Engineering Chem., Oct. 1932, vol. 24, No. 10, pp. 1137, 1138.

Mattiello, Protective and Decorative Coatings, vol. II, 1942, pp. 257, 288, 291, 379, 380.